US012801197B2

(12) United States Patent
Ou Yang et al.

(10) Patent No.: US 12,801,197 B2
(45) Date of Patent: Nov. 17, 2026

(54) ELECTRONIC CIRCUIT AND METHOD FOR PROVIDING PEAK POWER DEMAND TO THE LOAD END

(71) Applicant: Quanta Computer Inc., Taoyuan City (TW)

(72) Inventors: Kuang-Hua Ou Yang, Taoyuan City (TW); Chia-Wei Chen, Taoyuan City (TW); Shu-Chen Ni, Taoyuan City (TW); Wen-Kai Lee, Taoyuan City (TW)

(73) Assignee: Quanta Computer Inc., Taoyuan City (TW)

( * ) Notice: Subject to any disclaimer, the term of this patent is extended or adjusted under 35 U.S.C. 154(b) by 13 days.

(21) Appl. No.: 18/946,879

(22) Filed: Nov. 13, 2024

(65) Prior Publication Data

US 2026/0056588 A1 Feb. 26, 2026

Related U.S. Application Data

(60) Provisional application No. 63/686,054, filed on Aug. 22, 2024.

(51) Int. Cl.

| | |
|---|---|
| ***G06F 1/26*** | (2006.01) |
| ***H02M 1/00*** | (2007.01) |
| ***H02M 3/04*** | (2006.01) |
| ***H02M 3/156*** | (2006.01) |

(52) U.S. Cl.

CPC ............ *G06F 1/26* (2013.01); *H02M 1/0019* (2021.05); *H02M 3/04* (2013.01); *H02M 3/156* (2013.01)

(58) Field of Classification Search

CPC .................................. G06F 1/26; H02M 3/04

See application file for complete search history.

(56) References Cited

U.S. PATENT DOCUMENTS

| | | | | |
|---|---|---|---|---|
| 7,952,231 | B1 | 5/2011 | Zansky et al. | |
| 10,284,090 | B2 * | 5/2019 | Azrai | H02M 3/07 |
| 2009/0027930 | A1 * | 1/2009 | Usui | H02M 1/4225<br>363/84 |
| 2016/0268918 | A1 * | 9/2016 | Wang | H02M 3/156 |
| 2017/0329380 | A1 * | 11/2017 | Hung | H02M 1/4225 |

(Continued)

FOREIGN PATENT DOCUMENTS

| | | |
|---|---|---|
| CN | 109088542 A | 12/2018 |

OTHER PUBLICATIONS

Yousef, "Logic Gates with Truth Table [AND, OR, NAND, NOR]" https://web.archive.org/web/20240224232545/https://www.theengineerspost.com/logic-gates-with-truth-table/, Feb. 24, 2024.*

(Continued)

*Primary Examiner* — Jaweed A Abbaszadeh
*Assistant Examiner* — Cheri L Harrington
(74) *Attorney, Agent, or Firm* — Nixon Peabody LLP

(57) ABSTRACT

A system for providing power to a system load is disclosed. The system may comprise a power supply unit (PSU). A controller configured to receive data from the PSU and an input switch connected to the PSU may also be included. The system may also comprise an input capacitor connected to the input switch, an output capacitor connected to the input capacitor, and an output switch connected to a system load. The system may be configured to provide boost power to the system load when a constant current mode is determined.

20 Claims, 5 Drawing Sheets

(56) References Cited

U.S. PATENT DOCUMENTS

| | | | | |
|---|---|---|---|---|
| 2020/0133364 | A1* | 4/2020 | Muccini .................. | G06F 1/263 |
| 2022/0247310 | A1* | 8/2022 | Wittenbreder, Jr. .... | H02M 3/07 |

OTHER PUBLICATIONS

Extended European Search Report for EP Application No. 25171028.1 mailed Oct. 6, 2025, 13 pp.
Yousef, "Logic Gates with Truth Table [AND, OR, NAND, NOR] ," The Engineers Post, Jan. 16, 2024.
English Language Summary of TW Office Action for Application No. 114112921 mailed May 15, 2026, 1 pp.

* cited by examiner

ELECTRONIC CIRCUIT AND METHOD FOR PROVIDING PEAK POWER DEMAND TO THE LOAD END

CROSS-REFERENCE TO RELATED APPLICATIONS

This application claims priority from and benefit of U.S. Provisional Patent Application Ser. No. 63/686,054, filed on Aug. 22, 2024, titled "ELECTRONIC CIRCUIT AND METHOD FOR PROVIDING PEAK POWER DEMAND TO THE LOAD END," which is hereby incorporated by reference herein in its entirety.

FIELD OF THE INVENTION

The present invention relates generally to an electronic circuit, and more specifically, to an electronic circuit and method for providing power in response to a peak power demand.

BACKGROUND OF THE INVENTION

Electronic systems, such as computer server systems, may need a reliable power supply system. In some cases, electronic systems have power demands that may peak at a much higher requirement for a certain period compared to baseline power requirements. These periods of peak power demand may be required by electronic systems that are performing mission critical tasks. Some modern electronic systems have also increased their baseline operational voltage, further increasing peak power demands. Traditional approaches of meeting peak power requirements may involve increasing output capacity and/or quantity of power supplies, thereby leading to increased cost and complexity. Such power supplies are more expensive and require more space within the electronic systems. Likewise, meeting peak power demands using traditional approaches may require an increased number of capacitors or other components in power supply designs. Higher power may not be necessary during baseline power requirements, and periods of peak power may be infrequent. In such cases, power supplies with increased capacity, or systems that utilize a greater number of power supplies or capacitors may be overdesigned.

There is therefore a need for methods and systems for providing power in response to a peak power demand without increased design cost and space requirements. There is also a further need for methods and systems to increase the voltage of the supplied electric current in some peak power demand scenarios.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, a system comprises a power supply unit (PSU) configured to provide an electric current at an input voltage to a system load. The system also may comprise a controller configured to receive data from the PSU, and an input switch coupled to the PSU. The system may comprise an input capacitor coupled to the input switch. The input capacitor has the input voltage, and an output capacitor is coupled to the input capacitor and stores a specified voltage. A boost converter coupled to the input capacitor and the output capacitor may also be comprised within the system. The boost converter is configured to charge the output capacitor and is configured to receive and boost the input voltage to the specified voltage. An output switch coupled to the system load may deliver the electric current to the system load.

In a further aspect of the system, the input gate is a metal-oxide-semiconductor field-effect transistor (MOSFET) OR gate.

In yet a further aspect of the above implementation, the output gate is a metal-oxide-semiconductor field-effect transistor (MOSFET) OR gate.

According to another aspect of the present disclosure, the PSU and the system load of the system may be configured to operate at a voltage of 50V.

According to another aspect of the present disclosure, the controller of the system may be configured to receive data from the PSU comprising a PSU status, an output current, an input current, a temperature, a voltage, or any combination thereof.

According to a configuration of the above implementation, the controller may be configured to determine, based on the data from the PSU, a constant current mode of the system, and based on the constant current mode, disable the input switch and enable the output switch to transmit an electric current from the output capacitor to the system load.

In a further aspect of the present disclosure, the system may further comprise a voltage bus (VBUS) line that is coupled to the PSU, the input switch, the output switch, and the system load.

In another implementation of the present disclosure, a computing system is provided. The computing system may comprise one or more computing server systems, and a power supply unit (PSU) configured to provide an electric current at an input voltage to the one or more computing server systems. The system may also comprise a controller that may be configured to receive data from the PSU, and an input switch coupled to the PSU. An input capacitor coupled to the input switch may have the input voltage. An output capacitor coupled to the input capacitor may store a specified voltage. The system may also comprise a boost converter coupled to the input capacitor and the output capacitor. The boost converter is configured to charge the output capacitor, and to receive and boost the input voltage to the specified voltage. The system may comprise an output switch coupled to the one or more computing server systems.

In a further aspect of the system, the input gate is a metal-oxide-semiconductor field-effect transistor (MOSFET) OR gate.

In yet a further aspect of the above implementation, the output gate is a metal-oxide-semiconductor field-effect transistor (MOSFET) OR gate.

In a further aspect of the present disclosure, the PSU and the system load of the computing system may be configured to operate at a voltage of 50V.

In yet a further aspect of the present disclosure, the controller of the computing system is configured to receive data from the PSU comprising a PSU status, an output current, an input current, a temperature, a voltage, or any combination thereof.

According to another configuration of the above implementation, the controller may be configured to determine, based on the data from the PSU, a constant current mode of the system, and based on the constant current mode, disable the input switch and enable the output switch to transmit an electric current from the output capacitor to the system load.

In a further aspect of the present disclosure, the computing system may further comprise a voltage bus (VBUS) line that is coupled to the PSU, the input switch, the output switch, and the system load.

In another implementation of the present disclosure, a method is provided. The method may comprise receiving at an input switch from a power supply unit (PSU) an electric current. A controller communicatively coupled to receive data from the PSU may determine if the PSU has triggered a constant current mode. If the constant current mode has not been triggered, the method may comprise enabling the input switch, disabling an output switch, and transmitting an electric current from the input switch to an input capacitor. If the constant current mode has been triggered, the method may comprise disabling the input switch, enabling the output switch, activating a boost converter, and transmitting the electric current, by the boost converter, to an output capacitor. The method may also comprise transmitting the electric current, by output switch, from the output capacitor to a system load.

In a further aspect of the present disclosure, the PSU and the system load may be configured to operate at a voltage of 50V.

In yet another aspect of the above implementation, the controller may be configured to receive data from the PSU comprising a PSU status, an output current, an input current, a temperature, a voltage, or any combination thereof.

In a further aspect of the above implementation, the method may comprise boosting a voltage of the electric current from the input capacitor to a specified voltage and storing the specified voltage in the output capacitor.

In another aspect of the above implementation, the method may further comprise determining, by the controller, and based on the data from the PSU, the specified voltage.

In another aspect of the above implementation, the method may further comprise determining the constant current mode based at least on the data from the PSU.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments and are therefore not to be considered as limitations on the scope of the various embodiments or claims.

DETAILED DESCRIPTION

Figure 1:
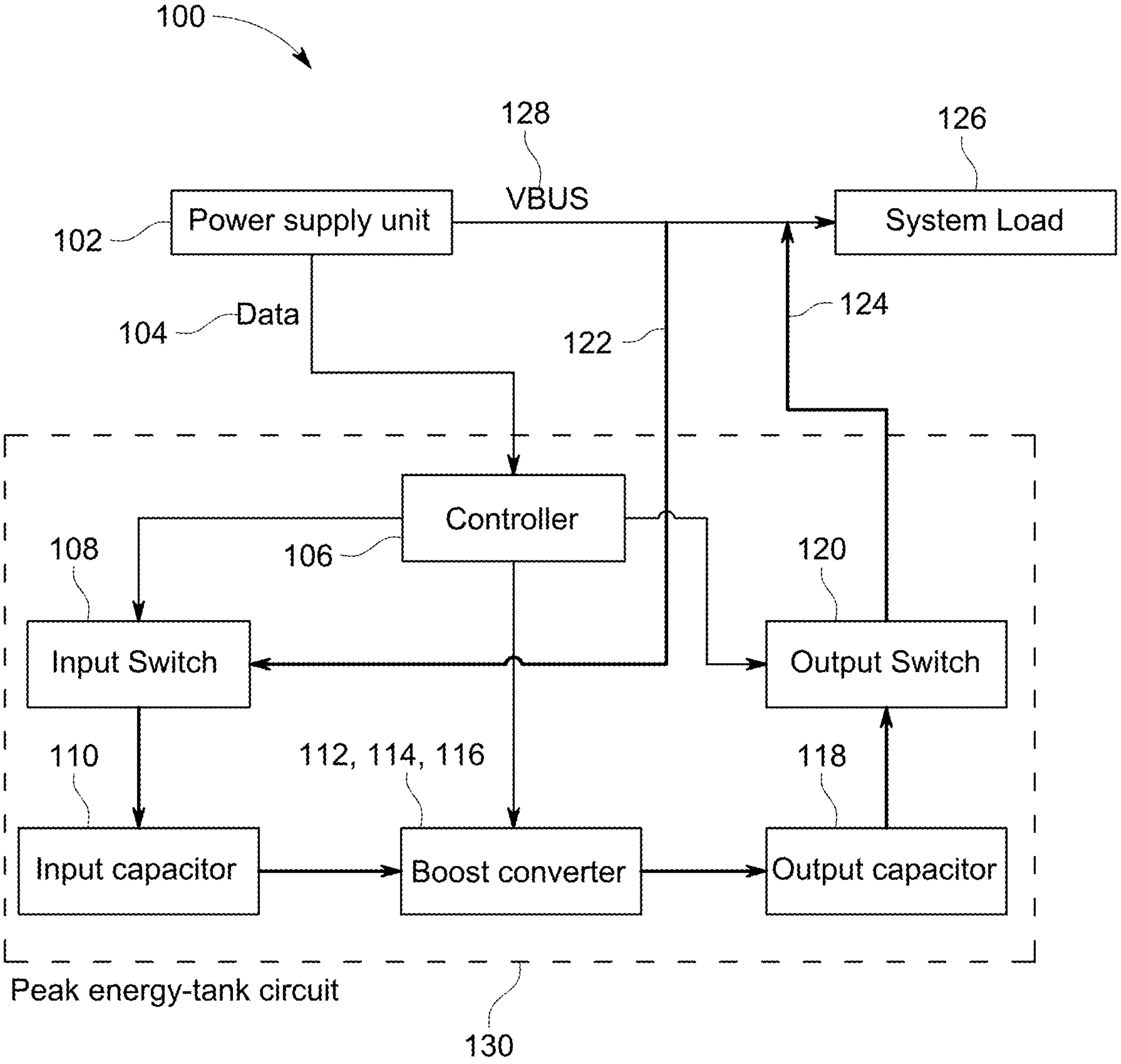
FIG. 1 is a diagram showing a peak energy-tank circuit in a computing system, according to certain aspects of the present disclosure.

The present disclosure relates to an electronic circuit, a computing system, and operating methods designed to meet peak power requirements of a system load while reducing the design cost and complexity of one or more PSUs. The present disclosure allows for a power delivery system for a system load to store energy in a peak energy tank circuit while the system load is not under constant current protection. When the one or more PSUs trigger constant current protection, the peak energy tank circuit may discharge its stored energy to provide peak power to the system load. In some example embodiments of the present disclosure, the system may also boost a voltage of the power supplied to the system load to a specified voltage.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Referring to FIG. 1, a peak energy-tank circuit 130 is provided. The peak energy-tank circuit 130 may be disposed within a computing system 100. The computing system 100 may comprise one or more power supply units (PSUs) 102 and a system load 126. The system load 126 represents components of the computing system 100 such as processors, memory devices, fans, controllers, and the like. The one or more PSUs 102 may be connected by a voltage bus (VBUS) line 128 to the system load 126. In some embodiments, the VBUS line 128 may be another type of connection capable of delivering power from the one or more PSUs 102 to the system load 126. The one or more PSUs 102 may be connected to a controller 106 by a data line 104. The controller 106 may be in the peak energy-tank circuit 130, or it may be in the computing system 100. The controller 106 may be configured to receive data from the data line 104 such as PSU status, output current, input current, temperature, and voltage. The controller 106 may also be configured to determine a constant current mode of the computing system 100.

Referring to the peak energy-tank circuit 130 of FIG. 1, the controller 106 may be connected to an input switch 108. In some embodiments of the present disclosure, the input switch 108 may be a logical OR MOSFET gate. In some other embodiments, the input switch 108 may be another type of MOSFET. The input switch 108 may be configured to be activated or deactivated by the controller 106 depending on the constant current mode of the computing system 100. When active, the input switch 208 may allow input current 122 in from the VBUS line 128. This input current 122 may then be transmitted into an input capacitor 110. The input capacitor 110 may store at least a portion of this input current 122.

The input capacitor 110 may be configured to transmit the input current 122 into a boost converter 114. The boost converter 114 includes a boost inductor 112 and a forward diode 116. The boost converter 114 may be configured to boost an input voltage of the input current 122 to a specified boost voltage. For example, in some embodiments of the present disclosure an input voltage range of 12V to 50V is boosted to a specified boost voltage of 50V. This creates a potential difference for peak power of 38V. In some embodiments, the specified boost voltage may be predetermined during configuration of the computing system 100. In some further embodiments, the specified boost voltage may be determined by the controller 106. The boost converter 114 may perform this boosting responsive to the constant current mode determined by the controller 106. The controller 106 may cause the boost converter 114 to boost the voltage of the input current 122 responsive to other signals as well.

In some embodiments of the present disclosure, the voltage-boosted or unboosted current may be transmitted to an output capacitor 118. The output capacitor 118 may be configured to store at least a portion of the boosted current. The output capacitor 118 may then transmit this current to an output switch 120. In some embodiments of the present disclosure, the output switch 120 may be a logical OR MOSFET gate. In some other embodiments, the output switch 120 may be another type of MOSFET. The output switch 120 may be connected to the controller 106. The controller 106 may disable or enable the output switch 120 according to the determined constant current mode of the computing system 100. Other signals may also be sent by the controller 106 to control the output switch 120. When the output switch 120 is enabled, the boosted current from the output capacitor 118 may be transmitted to the system load 126 as output current 124.

Figure 2:
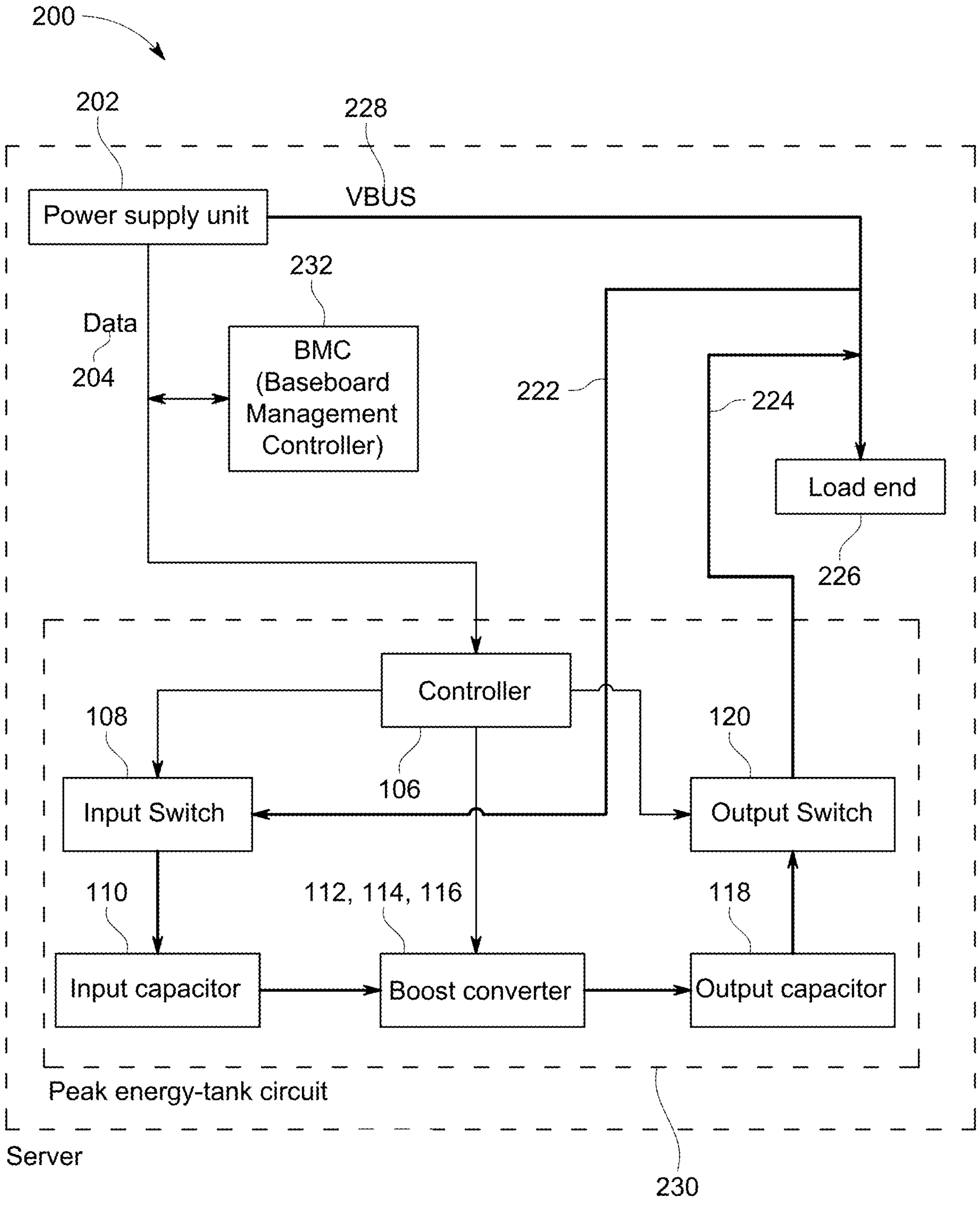
FIG. 2 is a diagram showing a peak energy-tank circuit in a computing system, according to certain aspects of the present disclosure.

Referring to FIG. 2, a diagram showing an example peak energy-tank circuit 130 disposed within a computing server environment is provided, in accordance with an example embodiment. The computing server environment 200 may comprise one or more PSUs 202 connected by a VBUS power connection 228 to a load end 226. The one or more PSUs 202 may also be configured to transmit data 204 to a baseboard management controller (BMC) 232. The BMC 232 may be configured to manage power delivery across the computing server environment 200 and may also monitor and control other operations such as cooling and start up and communicate operational data to an external device. The BMC 232 may also be configured to transmit data 204 to the controller 106 in the peak energy tank-circuit 130. In some example embodiments, the BMC 232 may be configured to receive data 204 comprising PSU status, output current, input current, temperature, voltage, or any combination thereof.

In certain aspects of the embodiment detailed in FIG. 2, the components and function of the peak energy-tank circuit 230 may be like the peak energy-tank circuit 130 outlined above (in FIG. 1). In certain example embodiments, the configuration of the peak energy-tank circuit 230 may be modified for use in the computing server environment 200. For example, one or more input switches 108 or output switches 120 may be used, or one or more input capacitors 110 or output capacitors 118 may be used. Likewise, the BMC 232 may be configured to control certain aspects of the peak energy-tank circuit 230, such as a constant current mode of the computing server environment 200. The peak energy-tank circuit 230 in the computing server environment 200 may be configured to receive input current 222 from the one or more PSUs 202. This current may be boosted depending on the constant current mode of the computing server environment 200, and then it may be delivered as output current 224 from the output switch 120 to the load end 226.

The computing server environment 200 may utilize a variety of voltages of operation. For example, the one or more PSUs 202 and the load end 226 of the computing server environment 200 may be configured to operate at 50V, with a low-voltage warning at 45V. Other voltage configurations are also possible. For example, the one or more PSUs 202 and the load end 226 of the computing server environment 200 may be configured to operate at 12V.

Figure 3:
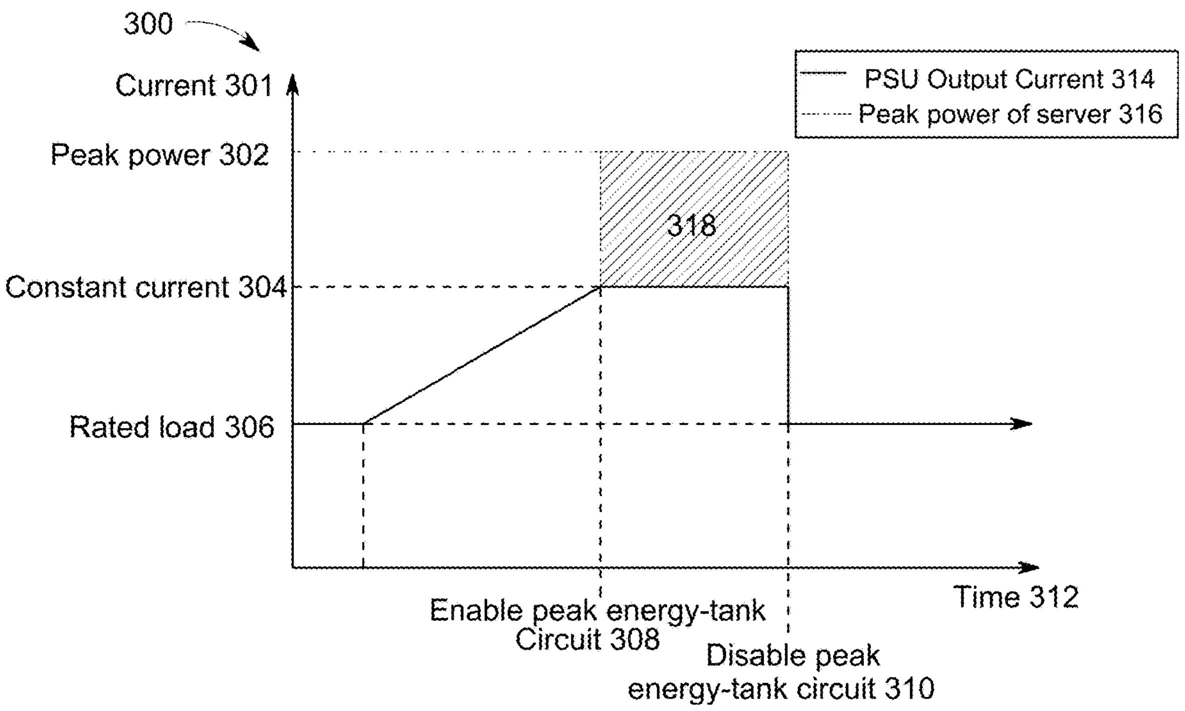
FIG. 3 is a graph showing a peak energy-tank circuit providing peak power, according to certain aspects of the present disclosure.

FIG. 3 is a graph 300 showing the peak power 302 provided by the example peak energy-tank circuit 130 (in FIG. 1) providing peak power 302, according to certain aspects of the present disclosure. The graph 300 shows the amount of current 301 provided to a computing server such as the computing server environment 200 (in FIG. 2) over time 312. The solid line represents PSU output current 314 and the dotted line represents a peak power of server 316. When a constant current mode 304 of the computing server is determined, the peak energy-tank circuit of the computing server may be enabled at a point on the timeline 308. This will cause peak power 302 to be provided by the peak energy-tank circuit to be provided to the computing server over a period of time, represented by the shaded region 318. The computing server may then determine that the constant current mode 304 has ended, and subsequently deactivate the peak energy-tank circuit at the point on the timeline demarcated 310. This will therefore end the provision of peak power to the computing server, and the computing server will be provided with its rated load 306.

Figure 4:
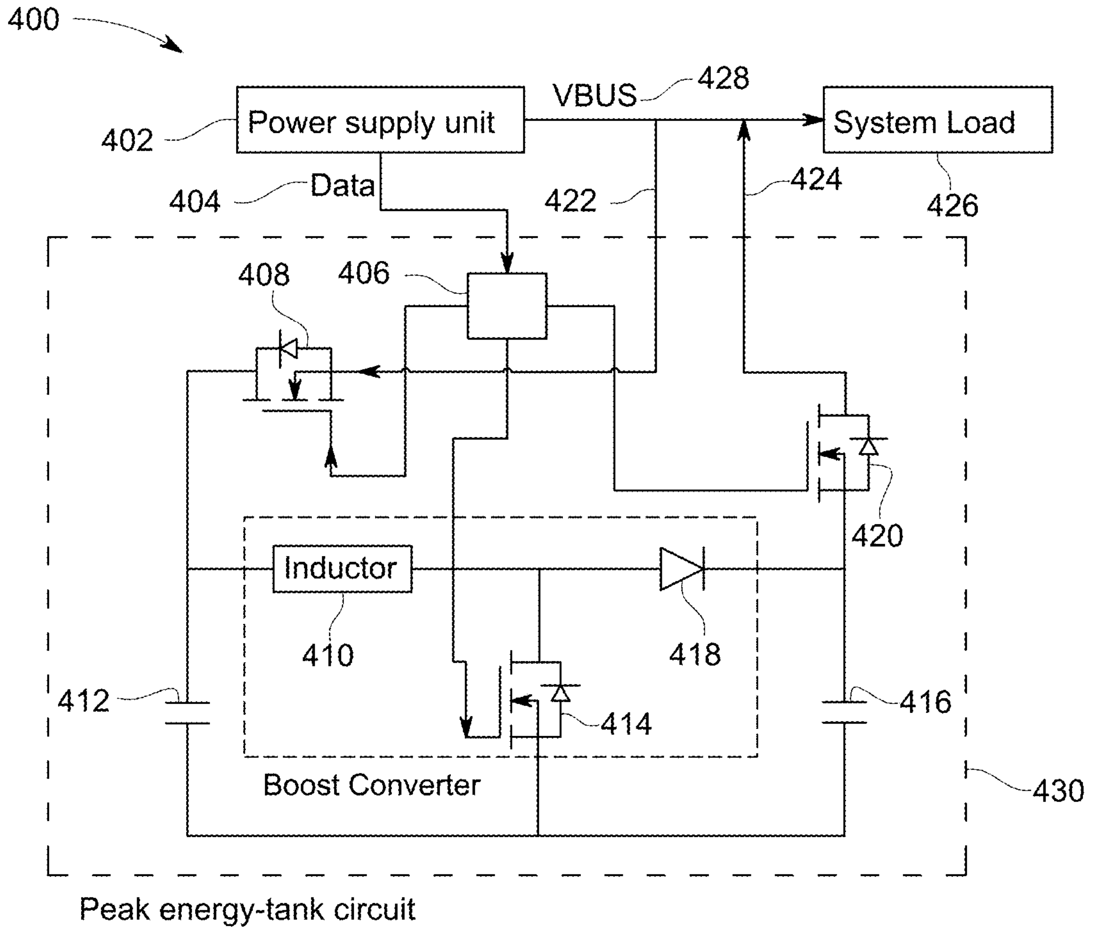
FIG. 4 is a circuit diagram showing a peak energy-tank circuit, according to certain aspects of the present disclosure.

Referring to FIG. 4, a circuit diagram of a system 400 including a peak energy-tank circuit 430, according to certain aspects of the present disclosure is provided. The system 400 may include one or more PSUs 402 connected by a VBUS 428 to provide power to a system load 426. The system load 426 is any component requiring power in the system 400. The VBUS 428 may also be another type of connection capable of providing power to the system load 426. The one or more PSUs may also be configured to provide data 404 to a controller 406. The controller 406 may be configured to determine a constant current mode of the system 400, similar to other example embodiments of the present disclosure.

Input current 422 may be provided to an input switch 408, which may be a logical OR MOSFET gate, as shown in FIG. 4. The input switch 408 may be enabled or disabled by the controller 406 to provide power to an input capacitor 412. The input capacitor 412 may store at least a portion of the input current 422. The input capacitor 412 may be configured to provide the input current 422 to a boost converter, which includes the inductor 410, a power switch 414, and a forward diode 418. In some example embodiments, the power switch 414 is a MOSFET. An inductor 410 and the forward diode 418 may be used to boost a voltage of the input current 422 to a specified boost voltage. The power switch 414 may be used to control the boosting of the input current 422 voltage by the inductor 410 and the forward diode 418. When the power switch 414 is enabled, the input current 422 will flow through the inductor 410 and the power switch 414, thereby storing energy in the inductor 410. When the power switch 414 is disabled, the input current 422 will be boosted to the specified boost voltage and directed to the forward diode. The power switch 414 may be controlled by the controller 406, according to the determination of the constant current mode of the system 400. The specified boost voltage may be predetermined during configuration of the system 400, or it may be determined by the controller 406. In some example embodiments of the present disclosure, the boost converter may comprise additional or alternative components.

At least part of the boosted or unboosted voltage of the boost converter may be stored in the output capacitor 416. When a constant current mode is determined by the controller 406, the output capacitor 416 may be configured to provide output current to the output switch 420. Similar to the input switch 408, the output switch 420 may be an OR MOSFET gate. Other types of logic gates and manufacturing processes may also be used. The output switch 420 may be configured to provide output current 424 to the system load 426. This output current 424 may be boosted by the boost converter to a specified boost voltage, allowing the peak energy-tank circuit 430 to provide peak power to the system load 426.

Figure 5:
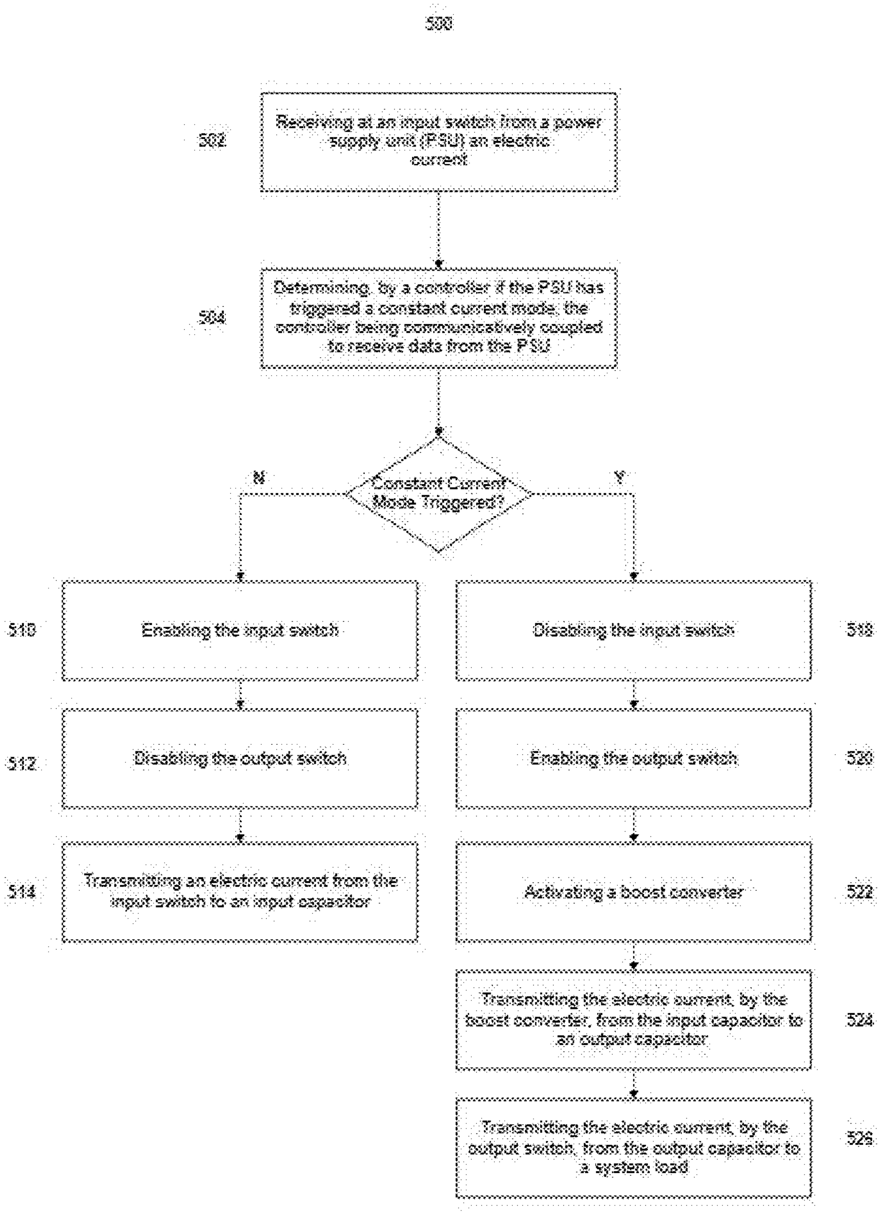
FIG. 5 is a flowchart showing a method of providing peak power, according to certain aspects of the present disclosure.

Referring to FIG. 5, a flowchart 500 detailing a method of operation according to certain aspects of the present disclosure is given. The flow diagram in FIG. 5 is representative of example machine readable instructions for routines to provide power in response to a peak power demand. In this example, the machine readable instructions comprise an algorithm for execution by: (a) a processor; (b) a controller; and/or (c) one or more other suitable processing device(s). The algorithm may be embodied in software stored on tangible media such as flash memory, CD-ROM, floppy disk, hard drive, digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit [ASIC], a programmable logic device [PLD], a field programmable logic device [FPLD], a field programmable gate array [FPGA], discrete logic, etc.). For example, any or all of the components of the interfaces can be implemented by software, hardware, and/or firmware. Also, some or all of the machine readable instructions represented by the flowcharts may be implemented manually. Further, although the example algorithm is described with reference to the flowchart 500 illustrated in FIG. 5, persons of ordinary skill in the art will readily appreciate that many alternative methods of implementing the example machine readable instructions may be used. For example, the order of execution of the blocks may be changed, and/or some of the blocks described may be changed, eliminated, or combined The method includes block 502 of receiving electric current at an input switch from a power supply unit (PSU). At block 504, a controller such as the controller 106 (in FIG. 1), determines if the PSU has triggered a constant current mode. The PSU controller is connected to receive data from the PSU.

Blocks 510-514 of FIG. 5 may occur if the constant current mode has not been triggered. The constant current mode may be determined by the controller 106. The constant current mode may also be determined by a processor or controller elsewhere in the system, such as the BMC 232 (in FIG. 2). In this case, block 510 enables the input switch. At block 512, the output switch is disabled. At block 514, electric current is transmitted from the input switch to an input capacitor.

Blocks 518-526 of FIG. 5 may occur if the constant current mode has been triggered. The constant current mode may be determined by the controller. The constant current mode may also be determined by a processor or controller elsewhere in the system. In this case, the input switch is disabled in block 518. The output switch is enabled in block 520. At block 522 a boost converter is activated. The boost converter may include a forward diode and a boost inductor, as explained above (in FIG. 4). Electric current is transmitted from the input capacitor to an output capacitor by the boost converter in block 524. In block 526, the electric current is transmitted from the output capacitor to a system load by the output switch.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments.

Rather, the scope of the disclosure should be defined in accordance with the following claims and their equivalents.

What is claimed is:

1. A system comprising:

a power supply unit (PSU) configured to provide an electric current at an input voltage to a system load;

a controller configured to receive data from the PSU;

an input switch coupled to the PSU and controlled by the controller;

an input capacitor coupled to the input switch, the input capacitor having the input voltage, wherein the input switch couples the PSU to the input capacitor when the input switch is enabled by the controller;

an output capacitor coupled to the input capacitor, the output capacitor storing a specified voltage;

a boost converter coupled to the input capacitor and the output capacitor, the boost converter being configured to charge the output capacitor, the boost converter being configured to receive and boost the input voltage to the specified voltage; and an output switch coupled to the system load and the output capacitor, the output switch controlled by the controller, wherein the controller enables a constant current mode by disabling the input switch to disconnect the PSU from the input capacitor and enabling the output switch to couple the output capacitor to the system load.

2. The system of claim 1, wherein the input switch is a metal-oxide-semiconductor field-effect transistor (MOSFET) OR gate.

3. The system of claim 1, wherein the output switch is a metal-oxide-semiconductor field-effect transistor (MOSFET) OR gate.

4. The system of claim 1, wherein the PSU and the system load are configured to operate at a voltage of 50V.

5. The system of claim 1, wherein the controller is configured to receive data from the PSU comprising a PSU status, an output current, an input current, a temperature, a voltage, or any combination thereof.

6. The system of claim 5, wherein the controller is configured to:

determine, based on the data from the PSU, the constant current mode of the system.

7. The system of claim 1, further comprising a voltage bus (VBUS) line that is coupled to the PSU, the input switch, the output switch, and the system load.

8. A system comprising:

one or more computing server systems;

a power supply unit (PSU) configured to provide an electric current at an input voltage to a system load of the one or more computing server systems;

a controller configured to receive data from the PSU;

an input switch coupled to the PSU and controlled by the controller;

an input capacitor coupled to the input switch, the input capacitor having the input voltage, wherein the input switch couples the PSU to the input capacitor when the input switch is enabled by the controller;

an output capacitor coupled to the input capacitor, the output capacitor storing a specified voltage;

a boost converter coupled to the input capacitor and the output capacitor, the boost converter being configured to charge the output capacitor, the boost converter being configured to receive and boost the input voltage to the specified voltage; and an output switch coupled to the one or more computing server systems and the output capacitor, the output switch controlled by the controller, wherein the controller enables a constant current mode by disabling the input switch to disconnect the PSU from the input capacitor and enabling the output switch to couple the output capacitor to the system load.

9. The system of claim 8, wherein the input switch is a metal-oxide-semiconductor field-effect transistor (MOSFET) OR gate.

10. The system of claim 8, wherein the output switch is a metal-oxide-semiconductor field-effect transistor (MOSFET) OR gate.

11. The system of claim 8, wherein the PSU and the system load are configured to operate at a voltage of 50V.

12. The system of claim 8, wherein the controller is configured to receive data from the PSU comprising a PSU status, an output current, an input current, a temperature, a voltage, or any combination thereof.

13. The system of claim 12, wherein the controller is configured to:

determine, based on the data from the PSU, the constant current mode of the system.

14. The system of claim 8, further comprising a voltage bus (VBUS) line that is coupled to the PSU, the input switch, the output switch, and the system load.

15. A method comprising:

receiving at an input switch from a power supply unit (PSU) an electric current;

enabling the input switch via a controller to couple the PSU to an input capacitor, the controller being communicatively coupled to receive data from the PSU;

disabling an output switch via the controller;

transmitting the electric current from the input switch to the input capacitor;

determining, by the controller if the PSU has triggered a constant current mode, and; on determining the constant current mode has been triggered:

disabling the input switch via the controller, enabling the output switch via the controller to couple an output capacitor to a system load, activating a boost converter, transmitting the electric current, by the boost converter, from the input capacitor to the output capacitor; and transmitting the electric current, by the output switch, from the output capacitor to the system load.

16. The method of claim 15, wherein the PSU and the system load are configured to operate at a voltage of 50V.

17. The method of claim 15, further comprising receiving data, via the controller, from the PSU, the data including a PSU status, an output current, an input current, a temperature, a voltage, or any combination thereof.

18. The method of claim 17, further comprising:

boosting a voltage of the electric current from the input capacitor to a specified voltage; and storing the specified voltage in the output capacitor.

19. The method of claim 18, further comprising:

determining, by the controller, and based on the data from the PSU, the specified voltage.

20. The method of claim 19, further comprising determining, via the controller, the constant current mode based at least on the data from the PSU.

* * * * *